Figure 1:
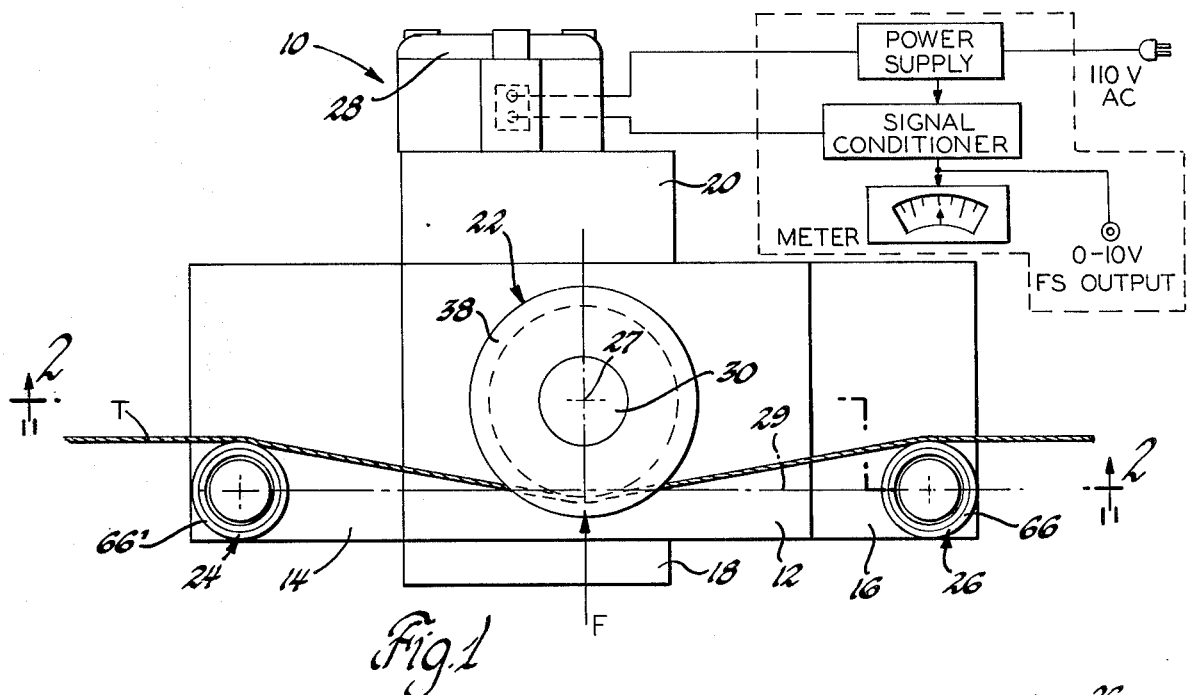

United States Patent [19]
Greb

[11] 4,041,779
[45] Aug. 16, 1977

[54] PNEUMATIC TENSION GAUGE
[75] Inventor: William H. Greb, Sandusky, Ohio
[73] Assignee: General Motors Corporation, Detroit, Mich.
[21] Appl. No.: 721,518
[22] Filed: Sept. 8, 1976
[51] Int. Cl.² .............................................. G01L 5/08
[52] U.S. Cl. .................................. 73/144; 308/DIG. 1
[58] Field of Search .............. 73/144, 143; 242/75.43, 242/75.44; 308/1 A, DIG. 1

[56] References Cited
U.S. PATENT DOCUMENTS
3,240,058  3/1966  Foster ..................................... 73/144

3,677,076  7/1972  Herzhoff et al. ...................... 73/144
3,861,207  1/1975  Barbee .................................. 73/144

*Primary Examiner*—Jerry W. Myracle
*Attorney, Agent, or Firm*—F. J. Fodale

[57] ABSTRACT

A gauge for measuring or monitoring the tension in a running thread comprises three rolls arranged such that a thread running under tension in driving engagement with the three rolls exerts a radial force on the middle reaction roll which includes a pneumatic radial bearing. The pressure at selected points in the annular layer of pressurized gas of the pneumatic bearing is sensed to indicate the tension in the running thread.

3 Claims, 5 Drawing Figures

PNEUMATIC TENSION GAUGE

This invention relates generally to tension gauges and more specifically to tension gauges for measuring or monitoring the tension in a running thread of enormous length such as in a textile machine which typically handle continuous threads thousands of feet in length.

In textile machinery it is often necessary to measure or monitor the tension in the running thread in order to control the quality of the thread. Generally such a tension gauge comprises three rolls arranged so that the running thread exerts a force which displaces or tends to displace the middle roller. The displacement or resistance to displacement is then measured to indicate the tension in the running thread. See the British Patent Specification 725,731 entitled "Testing Physical Qualities of Materials" filed by Institut Textile De France on Apr. 22, 1953 as Ser. No. 11081/53 and accepted on Jan. 12, 1955.

The designers of textile machinery are constantly striving for higher and higher operating speeds which of course also necessitates a tension gauge of high speed capabilities. In some very high speed textile equipment, pneumatic, that is, externally pressurized gas or air bearings have replaced ball bearings in certain components particularly roll shells such as are disclosed in U.S. Pat. No. 3,374,039 entitled "Antifriction Bearing" granted to Donald A. Voorhies on Mar. 19, 1968 and U.S. Pat. No. 3,527,510 entitled "Antihammer Device for Air Spindles" granted to Paul J. Christiansen on Sept. 8, 1970. It is also believed that these pneumatic roll shells have been or are being used in place of ball bearing roll shells in otherwise conventional tension gauges for measuring or monitoring tension in a running thread. However as far as Applicant is aware no one has yet utilized the unique characteristics of the pneumatic bearing to provide an extremely simple and efficient way to measure or monitor the tension of a running thread.

In its broadest aspects the object of my invention is to provide a tension gauge for measuring or monitoring the tension in a running thread which incorporates pneumatic bearings for high speed operation and which utilizes the unique chracteristics of the pneumatic bearing to simplify the tension gauge.

Another object of my invention is to provide a tension gauge for measuring or monitoring the tension in a running thread in which the reaction roll incorporates a pneumatic bearing and in which the pressure in the pneumatic bearing is used to signal the tension in the running thread.

Yet another object of my invention is to provide a tension gauge of the above noted type in which the pressure differential in the pneumatic bearing is sensed to signal the tension in the running thread.

Figure 2:
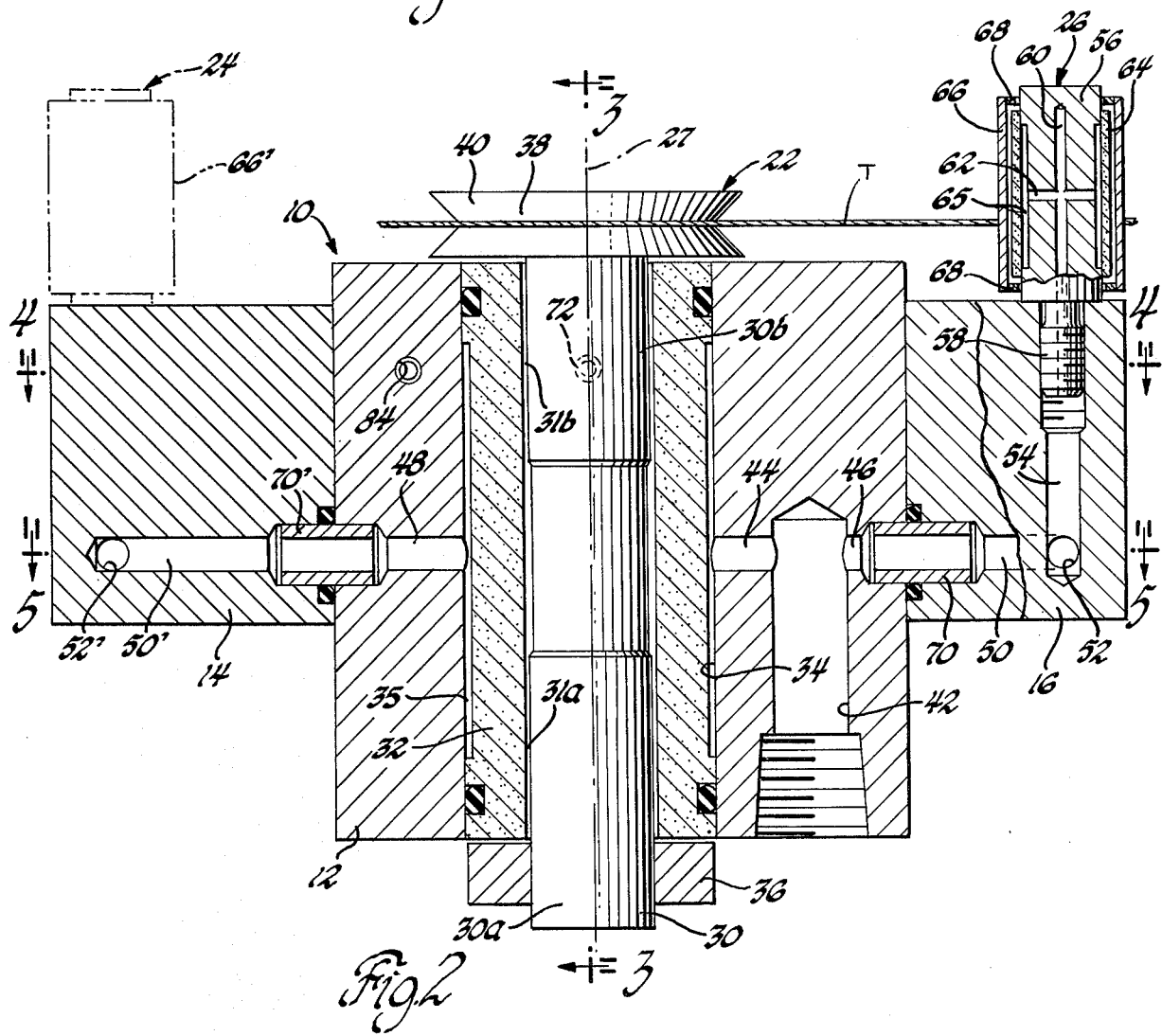
Figure 3:
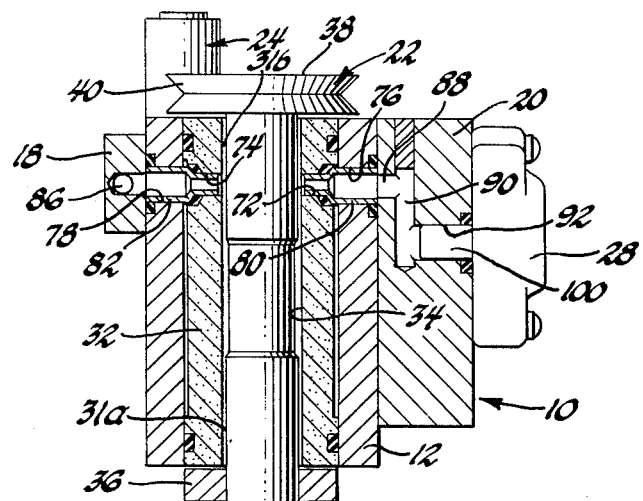
Figure 4:
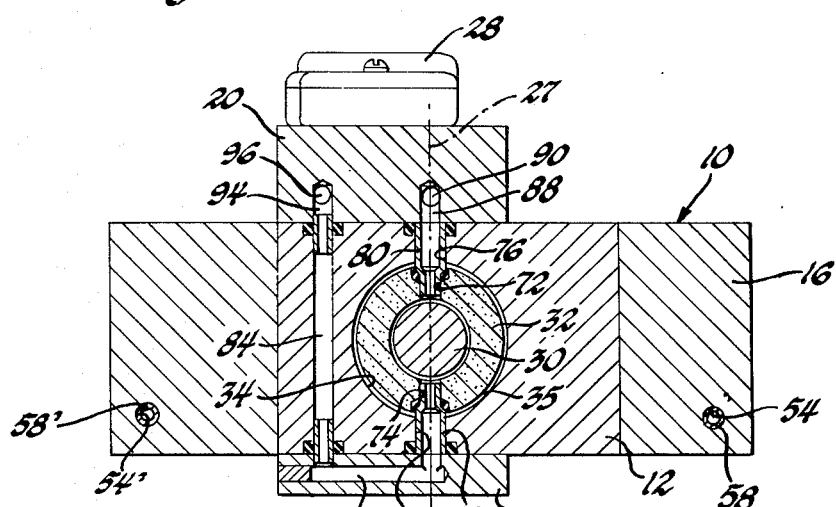
Figure 5:
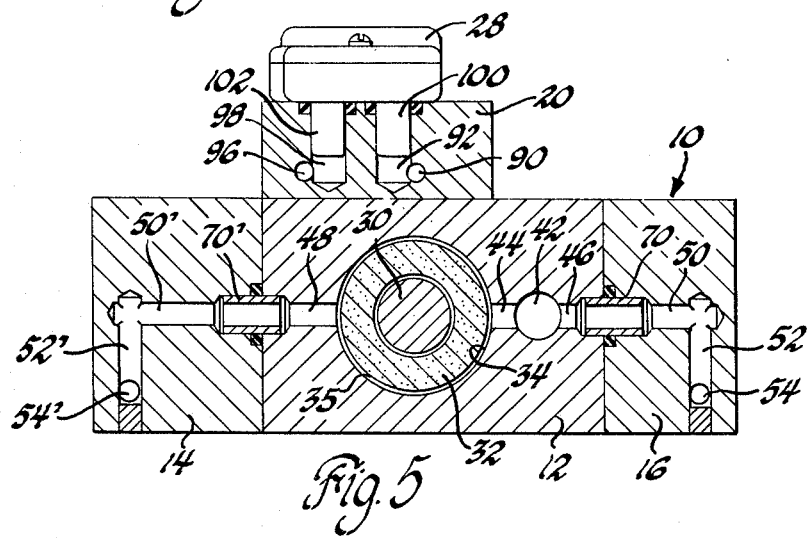

Other objects and features of the invention will become apparent to those skilled in the art as the disclosure is made in the following detailed description of a preferred embodiment of the invention as illustrated in the accompanying sheets of drawings in which:

FIG. 1 is a partly schematic, front view, of a tension gauge in accordance with my invention, FIG. 2 is a section taken substantially along the line 2—2 of FIG. 1 looking in the direction of the arrows, FIG. 3 is a section taken substantially along the line 3—3 of FIG. 2 looking in the direction of the arrows, FIG. 4 is a section taken substantially along the line 4—4 of FIG. 2 looking in the direction of the arrows, and FIG. 5 is a section taken substantially along the line 5—5 of FIG. 2 looking in the direction of the arrows.

Referring now to the drawings and particularly FIG. 1 the tension gauge comprises a multipiece housing or support 10 which includes a center block 12, side blocks 14 and 16, crossover manifold 18 and instrument mount 20. The tension gauge further includes a reaction roll 22 operativelyassociated with the center block 12 intermediate a pair of idler rolls 24 and 26 supported by the side blocks 14 and 16 respectively. The rolls 22, 24 and 26 are mounted for rotation about three spaced parallel axes and are arranged such that a continuous thread T running under tension in engagement with the three rolls exerts a radial force F on the reaction roll 22. The tension gauge is operated by a source of air or gas under pressure (not shown) and an instrument responsive to pressure differential, such as an electronic pressure transducer 28 is secured to the instrument mount 20 for providing an input signal to the signal means shown schematically.

Referring now to FIGS. 2 and 5 the reaction roll 22 comprises a shaft 30 which is journalled in a porous sleeve 32, preferably graphite, which in turn is nonrotatably mounted by rubber O-rings in an axial bore 34 extending through the center block 12. The rubber O-rings permit a slight resilient adjustment of the sleeve 32 in the radial direction during operation and also provide seals for an annular plenum 35 formed by the undercut central portion of the porous sleeve 32 and the axial bore 34. The cylindrical portions 30a and 30b of the shaft 30 have a diameter which is a few thousandths of an inch less than the diameter of the bore of the porous sleeve 32 forming annular clearances or spaces 31a and 31b therebetween which are greatly exaggerated in the drawing for purposes of illustration. Thrust rings 36 and 38 are press fitted or otherwise nonrotatably secured to each end of the shaft 30 and spaced a few thousandths of an inch from the respective end faces of the porous sleeve 32 forming axial clearances or spaces. The enlarged thrust ring 38 has a periphery in the shape of a V-groove 40 which receives and locates the running thread T.

The center block 12 also includes an offset, blind ended, axial inlet bore 42 which has a threaded end portion for connecting the inlet bore 42 to a source of air or other gas under pressure for operating pneumatic, that is, externally pressurized gas bearings incorporated in the reaction roll 22 and idler rolls 24 and 26. To this end, the center block 12 has a transverse or radial bore which intersects the axial inlet bore 42 and the axial through bore 34 providing three aligned passages — passage 44 between the axial bores 34 and 42 for feeding the plenum 35, passage 46 leading from the inlet bore 42 to one side surface of the center block 12 for feeding the pneumatic bearing of idler roll 26 and passage 48 leading from the bore 34 or plenum 35 to the opposite side surface of the center block 12 for feeding the pneumatic bearing of idler roll 24.

The side block 26 and idler roll 26 mounted thereon are typical and consequently the following detailed description thereof will suffice for an understanding of both side blocks and idler rolls. The side block 16 has a serpentine passage extending through it comprised of three components — a transverse blind ended bore 50 which leads from an opening in the side surface of the block, an intermediate vertical blind ended and plugged bore 52 (see FIG. 5), and a blind ended axial bore 54 which exits at the front surface of the side block 16. The axial bore 54 has an internally threaded end portion by means of which the idler roll 26 is attached to the side block 16.

The idler roll 26 is a pneumatic type which is disclosed in the U.S. Pat. No. 3,374,039 entitled "Antifriction Bearing" granted to Donald A. Voorhies on Mar. 19, 1968 and may include the improvements disclosed in the U.S. Pat. No. 3,572,510 entitled "Antihammer Device for Air Spindles" granted to Paul J. Christiansen on Sept. 8, 1970. Briefly the idler roll 26 comprises a hub 56 having a threaded shank 58 secured in the threaded end of the bore 54. The hub 56 has a circumferential groove which communicates with an axial inlet 60 via radial passages 62. A porous sleeve 64, preferably graphite, is nonrotatably secured to the hub 56 enclosing the circumferential groove and forming a plenum 65. A rotatable shell 66 having an inner diameter which is a few thousandths of an inch greater than the outer diameter of the porous sleeve 64 surrounds the sleeve forming an annular gas bearing space. The shell 66 has annular thrust rings 68 at each end for centering the roll shell 66 with respect to the hub 56 in the longitudinal direction.

The bore 50 in the side block 16 is aligned with the passage 46 in the center block 12. Each has a counterbored end portion receiving a sleeve 70 which crosses the interface of the blocks 12 and 16 which interface may be sealed by an O-ring surrounding the sleeve 70. The center block 12 and the side block 16 may be secured to each other in any suitable manner.

The idler rolls 24 and 26 are substantially identical while the side block 14 is substantially an opposite hand equivalent of the side block 16. Where appropriate comparable components have been identified with like numerals with those for the idler roll 24 and side block 14 being primed.

When gas under pressure such as compressed air is supplied to the inlet 42, the gas flows relatively unrestricted via passage 44 into plenum 35. The gas then flows radially through the restrictive (and consequently regulatory) porous sleeve 32 into the annular clearances 31a and 31b forming an annular layer of pressurized gas which pneumatically supports the shaft 30 for practically friction free rotation. The gas or air flows continuously into the annular clearances 31a and 31b and then axially along the shaft exhausting through the axial spaces between the end faces of the porous sleeve 32 and the thrust rings 36 and 38. The exhaust flow through the axial spaces and the gas flowing from the end faces of the porous sleeve 32 provides pneumatic thrust bearings which center the rotatable parts of the roll 22 in the axial direction.

A portion of the gas from inlet 42 also flows into the plenum 65 for the idler roll 26 via passage 46, bores 50, 52 and 54, inlet 60 and radial passages 62. As before, the gas delivered to the plenum 58 flows radially through the porous sleeve 64 in a regulated manner for pneumatically supporting the roll shell 66 radially and pneumatically centering the roll shell 66 axially. In a similar manner the roll shell 66' of the idler roll 24 is supported on pneumatic radial and thrust bearings by gas supplied from the inlet bore 42 via the plenum 35 and bores 50', 52' and 54' and structure of the idler roll 24 itself.

OPERATION OF THE TENSION GAUGE

When no external radial forces are acting on the reaction roll 22, the shaft 30 is centered in the porous sleeve 32 and the pressure of the gas in the annular clearances or spaces 31a and 31b is substantially uniform around the diameter of the shaft 30.

Referring back to FIG. 1, the thread T running under tension in engagement with the rolls 22, 24 and 26 exerts a radial force F on the reaction roll 22 which is substantially equal to twice the vertical component of the tension in the running thread T. The reaction roll 22 counteracts the radial force F by the shaft 30 moving off center of the porous sleeve 32 in the direction of the radial force F until a new equilibrium position is reached. This movement reduces the radial dimension of the spaces 31a and 31b and increases the pressure of the gas therein on one side of the shaft 30 while on the opposite side the radial dimension is increased and the pressure of the gas is decreased. Consequently whenever an external radial force is applied to the reaction roll 22, a pressure differential is created in the annular layer of gas surrounding the shaft 30 which is related to the magnitude of the applied radial force F.

The pressure differential across the shaft 30 depends on the radial direction, the axial location and the magnitude of the applied radial force F. The V-groove 40 locates the radial force F axially and the axis of the reaction roll 22 is preferably located equidistant from the axes of the idler rolls 24 and 26 which have the same outer diameter so the applied radial force F acts essentially in the axial plane 27 of the porous sleeve 32 which is the perpendicular bisector of the plane 29 joining the idler roll axes as shown in FIG. 1. Such a roller arrangement permits the use of a single pair of diametrically opposed pressure taps located in the perpendicular bisector plane 27 resulting in an extremely simplified tension gauge. It is, to be understood however, that other pressure tap arrangements are contemplated, such as a second diametrically opposed pair of pressure taps at a second axial location to compensate for an unknown axial location of the applied radial force F or an orthogonal arrangement of four pressure taps at one axial location to compensate for an unknown radial direction of the applied radial force F.

The construction details of the pressure taps are shown in FIGS. 3 and 4. The porous sleeve 32 has a pair of diametrically opposed radial bores 72 and 74 which open into the annular clearances or space 31b approximately midway between its axial ends. The center block 12 also has a vertical bore intersecting the axial bore 34 providing a pair of bores 76 and 78 aligned with the radial bores 72 and 74 for receiving necked tubular pressure taps 80 and 82 respectively. The taps are designed to provide substantially sealed passages through the porous sleeve 32 and annular plenum 35. To this end the taps 80 and 82 are pressed radially inwardly by the crossover manifold 18 and the instrument mount 20 respectively, thus compressing the associated O-rings in the porous sleeve 32 and bringing the necked ends of the taps as close to the inner surface of the porous sleeve 32 as possible. The O-rings at the interfaces partly defined by the center block 12 are also compressed when the crossover manifold 18 and instrument mount 20 are suitably secured to the center block 12. For convenience the taps 80 and 82 shall be referred to as the high pressure and low pressure taps respectively. As best seen in FIG. 4, the high pressure tap 80 exits at the top surface of the center block 12 while the low pressure tap 82 continues through a passage 86 in the crossover manifold 18 and a second vertical bore 84 extending through the center block 12 to an exit at the top surface.

The instrument mount 20 has a pair of parallel serpentine passages forming continuations of the pressure taps 80 and 82-86-84. Specifically the continuation of the high pressure tap 80 comprises a vertical, blind ended inlet bore 88, a blind ended and plugged intermediate axial bore 90 and a vertical, blind ended enlarged outlet bore 92. The continuation of the low pressure tap 82-86-84 similarly comprises inlet bore 94, intermediate bore 96 and enlarged outlet bore 98.

Secured to the instrument mount 20 is an instrument responsive to pressure differential such as an electronic pressure transducer 28 which by means of pressure tubes 100 and 102 respectively disposed in the high pressure outlet 90 and the low pressure outlet 98 produces an electrical signal which varies in accordance with the different pressures of the gas in the tubes 100 and 102. This electrical signal may then be used to locate the pointer on a direct readout meter as schematically illustrated in FIG. 1 or to control some other device such as a power drive for maintaining a predetermined tension on the thread.

I wish it to be understood that I do not desire to be limited to the exact details of construction shown and described, for obvious modifications will occur to a person skilled in the art.

What is claimed is:

1. A tension gauge for measuring the tension in a running thread comprising a support having a pair of laterally spaced idler rolls mounted thereon for rotation about spaced parallel axes, a reaction roll mounted on said support intermediate said pair of idler rolls for rotation about an axis parallel to and intermediate said parallel axes, said rolls being arranged such that a thread running under tension in driving engagement with the three rolls exerts a radial force on the reaction roll, pneumatic means for rotatably supporting said reaction roll including an annular layer of pressurized gas between stationary and rotary members of the reaction roll, and signal means responsive to the pressure in said annular layer of gas at diametrically opposed points located in a plane intersecting the plane defined by the spaced parallel axes of the idler rolls.

2. A tension gauge for measuring tension in a running thread comprising a support having a pair of laterally spaced idler rolls mounted thereon for rotation about spaced parallel axes, said idler rolls including pneumatic radial bearing means, a reaction roll mounted on said support intermediate said pair of idler rolls for rotation about an axis equidistant from the parallel axes of said idler rolls, said rolls being arranged such that a thread running under tension in driving engagement with the three rolls exerts a radial force on said reaction roll, pneumatic means for rotatably supporting said reaction roll including an annular layer of pressurized gas between stationary and rotary members of said reaction roll, a pair of pressure tap means intersecting the surface of said stationary member adjacent said layer of pressurized gas at diametrically opposed points located in the axial plane of said stationary member which is the perpendicular bisector of the plane joining the spaced parallel axes of the idler rolls, and signal means responsive to the pressure in said annular layer of gas at said pressure tap means.

3. A tension gauge for measuring rotation in a running thread comprising a support having a pair of laterally spaced idler rolls mounted thereon for rotation about spaced parallel axes, said idler rolls including pneumatic radial bearing means, a reaction roll mounted on said support intermediate said pair of idler rolls for rotation about an axis equidistant from the parallel axes of said idler rolls, said rolls being arranged such that a thread running under tension in driving engagement with the three rolls exerts a radial force on said reaction roll, pneumatic means for rotatably supporting said reaction roll including an annular layer of pressurized gas between a stationary porous sleeve and a rotary shaft disposed therein, a pair of pressure tap means intersecting the inner surface of said porous sleeve adjacent said layer of pressurized gas at diametrically opposed points located in the axial plane of said porous sleeve which is the perpendicular bisector of the plane joining the spaced parallel axes of the idler rolls, said porous sleeve being surrounded by a plenum and said pressure tap means including tubes disposed in radial bores through said sleeves and extending through said plenum, signal means responsive to the pressure in said annular layer of gas at said pressure tap means including a pressure responsive transducer operatively connected to said pair of pressure tap means.

* * * * *